United States Patent
Lusk et al.

[11] 3,975,708
[45] Aug. 17, 1976

[54] VEHICLE CONDITION MONITORING SYSTEM

[75] Inventors: Joe F. Lusk, Medford; William H. Rood, Acton, both of Mass.

[73] Assignee: T.S.W.S., Inc., Boston, Mass.

[22] Filed: Dec. 11, 1974

[21] Appl. No.: 531,809

Related U.S. Application Data

[63] Continuation-in-part of Ser. No. 446,529, Feb. 27, 1974, abandoned.

[52] U.S. Cl. .............................. 340/80; 340/81 R; 340/52 R; 340/85; 340/251; 331/64; 315/77
[51] Int. Cl.[2] .......................................... B60Q 1/26
[58] Field of Search .................. 340/81 R, 52 R, 84, 340/85, 80, 248 E, 248 P, 248 D, 248 F, 251, 252 R, 52 F, 181, 205, 207 R, 213.1; 315/77, 82, 83; 331/64, 60, 61, 65, 66; 180/103, 82 R; 73/116

[56] References Cited
UNITED STATES PATENTS

| | | | |
|---|---|---|---|
| 3,355,708 | 11/1967 | Perry | 340/251 |
| 3,421,157 | 1/1969 | Atkins | 340/251 |

Primary Examiner—John W. Caldwell
Assistant Examiner—Donnie L. Crosland
Attorney, Agent, or Firm—Wolf, Greenfield & Sacks

[57] ABSTRACT

A display panel or console is mounted in the driving compartment of the vehicle in a position to be observed by the driver and provides status information regarding, for example, the operability of the headlights or taillights, and position information concerned primarily with the position of the trailer relative to the cab and whether there is a "jacknife" condition. The system may also check the status of truck tire pressure and brake drum temperature to determine if the pressure is too low or the temperature too high. The lights, for example, are checked by monitoring the continuity to the filament. The existing lines to the lamp are pulsed with a filtered square wave signal and a resistance sensor determines continuity; a lack of continuity causing illumination of the associated status lamp of the display panel. In another arrangement a memory circuit is associated with each indicator circuit so that a fault condition is stored and remains stored even if corrected. A diagnostic unit can then be later used to detect the condition of each memory circuit.

23 Claims, 12 Drawing Figures

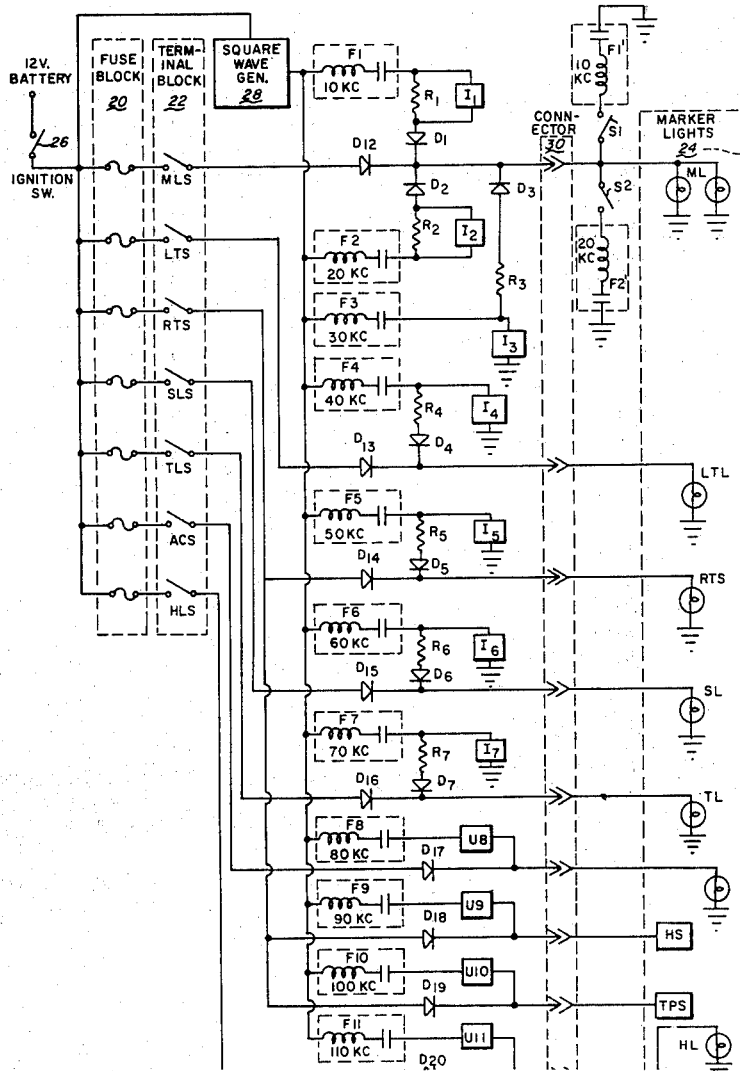

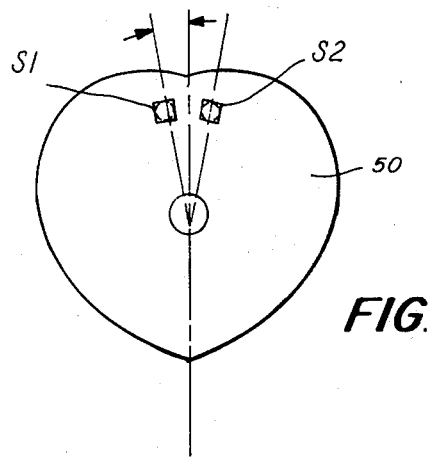
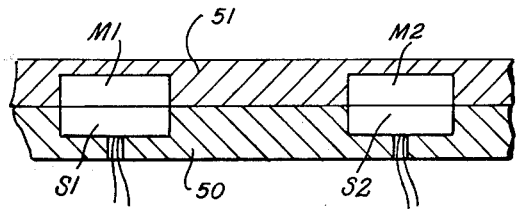
FIG. 7A  FIG. 7B
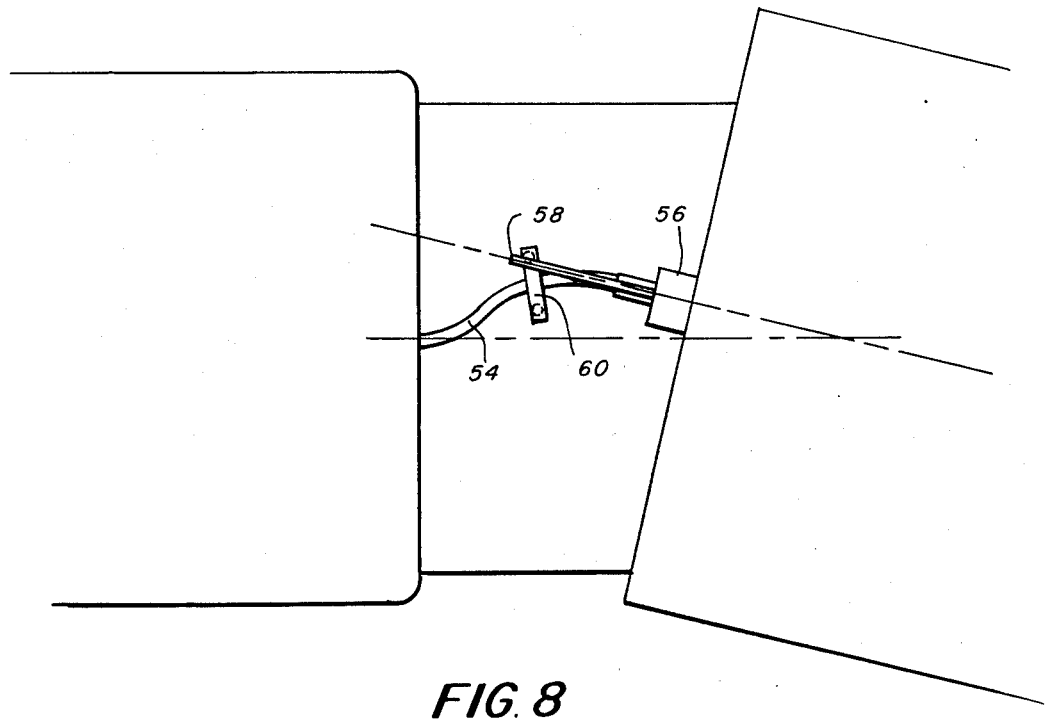
FIG. 8

VEHICLE CONDITION MONITORING SYSTEM

RELATED APPLICATIONS

This is a continuation-in-part application of application Ser. No. 446,529, filed Feb. 27, 1974 now abandoned.

BACKGROUND OF THE INVENTION

The present invention relates to an electrical system for monitoring the status of a number of load devices or conditions associated with the vehicle; the vehicle preferably being a truck. More particularly, this invention pertains to a vehicle condition monitoring system including means for detecting such conditions as a lamp outage and/or a "jacknife" condition. The monitoring system of this invention is most advantageous in that the detection circuitry makes use of the existing vehicle wiring.

Due to the ever increasing demand for the transportation of goods and materials, there is an ever expanding requirement for a larger number of vehicles as well as vehicles of increased size. This is evident by the greater use of trailer trucks and the tandem operation of these trucks. These trucks are not provided with sufficient safety devices for the protection of the truck driver and others. There are not sufficient monitoring devices. Accordingly, one object of the present invention is to provide a vehicle condition monitoring system including a display panel accessible to the driver for registering a number of different fault conditions that may occur in the vehicle such as the outage of a lamp or the overheating of a brakedrum.

Another object of the present invention is to provide a monitoring system for use preferably in a trailer truck and that includes means including display means for detecting a jacknife condition of the vehicle.

Regarding the aspect of the present invention pertaining to the monitoring of the condition of certain lamps or lights in the vehicle, it is noted that the prior art shows different systems for indicating the condition of lamps in a vehicle.

The problem with the prior art systems is that they all require a separate sensing system such as a magnetic sensing system and thus the systems become quite complex especially if there are a number of lamps to monitor.

Accordingly, another object of the present invention is to provide a vehicle condition monitoring system especially for monitoring the outage of lamps wherein the continuity of the lamp is checked by impressing and sensing an alternating signal on the existing vehicle wiring.

A further object of the present invention is to provide a system in accordance with the preceding object and that is relatively inexpensive to construct, easy to install in existing vehicles and that is relatively inexpensive.

It has also been found that many times a fault condition occurs and is only temporarily corrected by the driver. For example, there may be a small leak in the vehicle radiator that activates an indicator light. The driver then fills the radiator but the problem, which is not reported, remains.

Accordingly, another object of the present invention is to provide a condition monitoring system including memory means that registers a fault condition and maintains the fault reading even if the fault is temporarily corrected.

Still another object of this invention is to provide a system as in the preceding object and where a diagnostic unit is thereafter employed to read the condition of the memory means.

SUMMARY OF THE INVENTION

To accomplish the foregoing and other objects of this invention there is provided in a motor vehicle having a driving compartment, a number of load devices and means for providing energy to the load devices for operation thereof, a system for monitoring the operable condition of each load device. Most of these load devices are lamps of the vehicle and the system of the present invention is for monitoring the continuity of these lamps whether these lamps are being operated through the existing wiring of the vehicle or not. The system of this invention generally comprises a display console disposed in the driving compartment and including a plurality of indicator lights one being associated with each load device, a harmonic generator for establishing an alternating signal, separate lines for coupling the alternating signal to each load device by way of each line with each line preferably including its own filter circuit for passing only predetermined frequencies and a sensing element which may simply be a resistor connected in series between the filter circuit and the existing line which couples to the associated load device. With respect to the tail lights, for example, the sensing line would not be connected at the tail lights but could be connected in the driving compartment area from where the tail lights are controlled.

The system further comprises in one embodiment a sensing circuit associated with the sensing resistor for determining continuity to the load device. In the disclosed embodiment the presence of a voltage drop across the resistor is sensed to indicate the proper operation of the lamp and the absence of a voltage drop generates a signal which is coupled to the display panel for operating the indicator light of the display panel that is associated with the inoperative load device or lamp.

In an alternate arrangement for detecting the lamp outage instead of filtering the output from the squarewave generator, this output is coupled to a counter and a decoder circuit for providing time sequence signals for pulsing the existing wires in a sequential manner to detect lamp outage. This alternate arrangement may also employ a resistor sensing circuit in association with an indicator lamp.

In another embodiment of the present invention the system is adapted to store an indication of a particular fault that has occurred. For example, one fault that may be sensed is an overheating of the vehicle engine which is usually occasioned by the leakage of coolant from the radiator or hoses. Thus, the system may comprise a sensor for monitoring this condition which sensor would have an actuated state when the fault occurs and an unactuated state in the absence of the fault. The system also includes an indicator which would tell the operator of the vehicle when the fault has occurred. The memory storage means is responsive to the state of the sensor for setting the memory means to a fault indicating state when the sensor has been actuated. In the example given the sensor would be a heat sensor for determining when the temperature of the coolant has exceeded a predetermined value in which case the sensor is actuated. Preferably, the memory means is in the form of a bi-stable flip-flop device which is of the type that maintains the fault condition stored even if the fault is temporarily corrected. The flip-flop device is only reset by a special reset signal which is not furnished by the operator of the vehicle but is furnished at a later time after the state of the flip-flop has been sensed to determine if the fault occurred.

In accordance with still another aspect of the present invention there may be provided the memory circuit which is actuated if the battery power is interrupted. For example, if the vehicle is equipped with a sensor for determining when a predetermined speed has been exceeded, the operator of the vehicle may desire to reset the sensor for detecting this speed prior to returning for a status check. The operator may attempt to do this by disconnecting the battery with the belief that the memory storage means associated with the sensor will be reset. Actually, the memory storage means is reset, but by providing an additional memory storage means for detecting an interruption to power, the fact that the battery cable is disconnected can be detected.

Regarding another aspect of the present invention in an application specific to trailer trucks, the system is provided with means for sensing the alignment between the cab and trailer of the truck. This sensing means is disclosed as comprising a pair of magnetic switches either one of which may be operable when the trailer becomes out of line with the cab by some predetermined angular displacement. In association with these magnetic switches there are two indicator means for telling the driver the direction of the angular displacement so that he can readily compensate therefore.

BRIEF DESCRIPTION OF THE DRAWINGS

Numerous other objects, features and advantages of the invention will now become apparent upon a reading of the following detailed description taken in conjunction with the accompanying drawings, in which:

FIGS. 7A and 7B show one embodiment indicating the placement of the magnetic switches for detecting a "jackknife" condition;

FIG. 8 is an alternate embodiment for the magnetic switches shown in FIG. 7;

DETAILED DESCRIPTION

Figure 1:
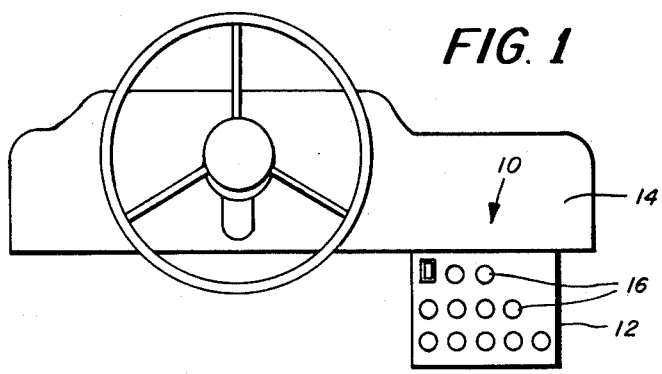
FIG. 1 shows the driving compartment of a vehicle and the display console disposed therein.

The system of the present invention is preferably for use in a truck which has a driving compartment as depicted in FIG. 1.

In the driving compartment 10 in accordance with this invention there is provided a display console 12 which is suitable mounted to or below the dashboard 14 of the vehicle. This display console includes a plurality of indicator lights 16 each of which is associated with a lamp or sensor of the vehicle. Each of the lamps and sensors that the indicators 16 are associated with are discussed and shown in more detail with reference to the circuit diagram of FIG. 2.

Figure 2:
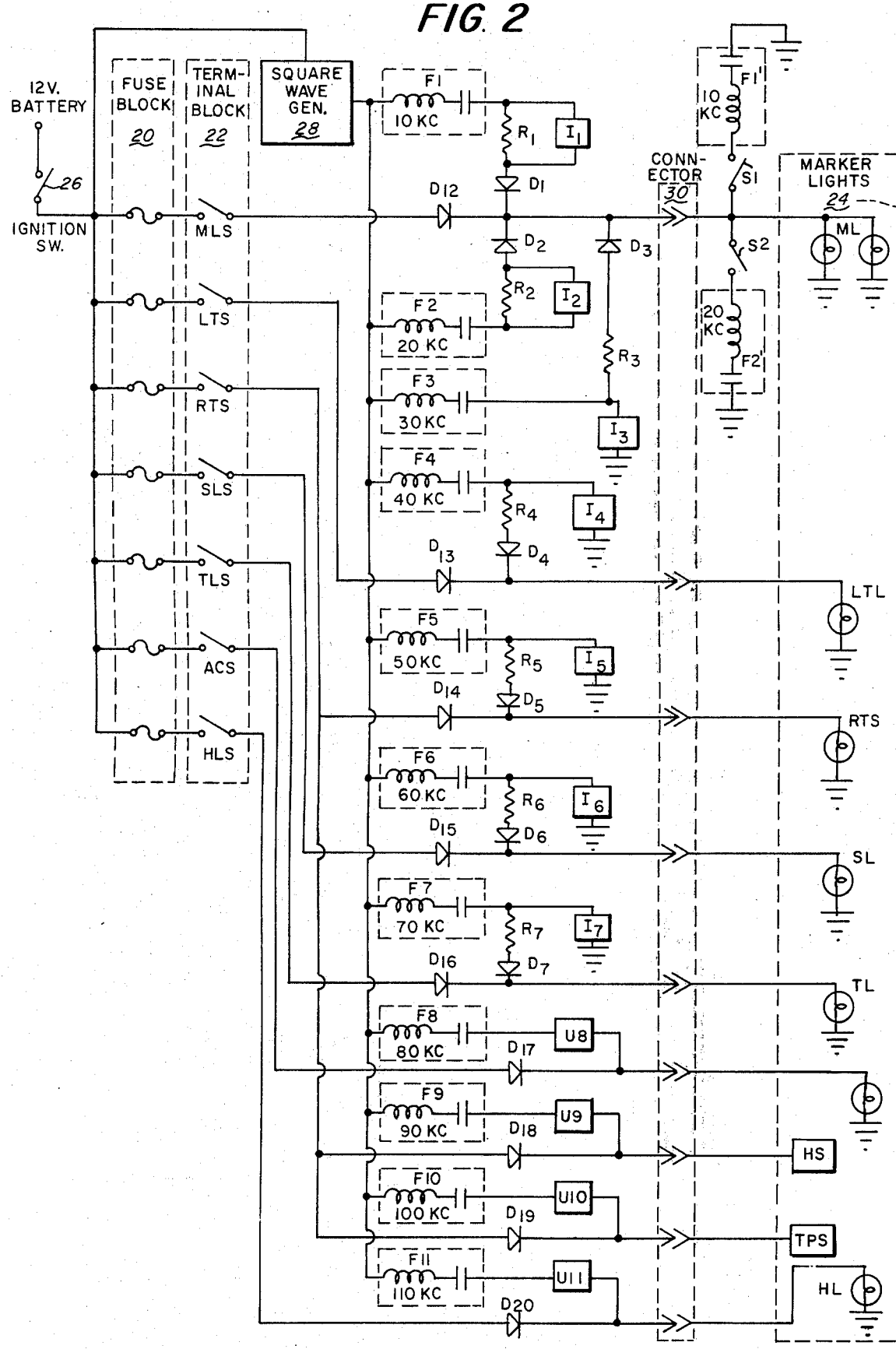
FIG. 2 shows a circuit diagram of one embodiment of the present invention.

In FIG. 2 part of the circuitry represents components that presently exist in the vehicle. Included in this category are fuse block 20, switch array 22, and the load devices contained within the dotted outline 24. These load devices include, for example, the marker lights ML; stop lights SL; and heat sensor HS. The other circuitry shown in FIG. 2 is added in accordance with the present invention and, as shown, connects with each of the lines coupling to the load devices.

In FIG. 2 the ignition switch 26 of the vehicle, when closed, couples the battery voltage to each of the fuses of the fuse box 20 and from there, respectively, to the switches of switch box 22. The switch box 22 includes, in order, the marker light switch MLS left turn signal switch LTS; right turn signal switch RTS; stop light switch SLS; tail light switch TLS; accessory switch ACS and headlight switch HLS. Each of these switches couple respectively by connector means and diodes D12–D20 to their corresponding load devices. It is noted in FIG. 2 that the heat sensor HS and the tire pressure sensor TPS receive power, respectively, by way of diodes D18 and D19 from the right turn signal switch as these two sensors are physically disposed close to the line from the right turn signal switch.

Figure 3A:
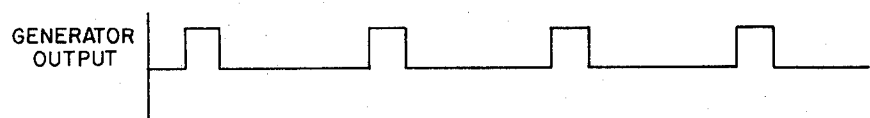
FIGS. 3A and 3B show waveforms associated with the circuit of FIG. 2.

The battery voltage couples from ignition switch 26 also to a squarewave generator 28. The output from the squarewave generator is shown in FIG. 3A. This signal may be at its low level for a period of 50 milliseconds, for example, and may be at its high pulsed level for a period of 5 milliseconds. The output from the squarewave generator 28 feeds to a plurality of filter circuits F1–F11 each of which may include a capacitor and inductor connected in series. In accordance with one aspect of the present invention at least some of the filter circuits have their components chosen so that they pass only predetermined frequencies. For example, in FIG. 2 the filter circuit F1 passes frequencies about 10 KC and filter circuit F2 passes frequencies about 20 KC. The filter circuits each in turn couple by way of a sensing resistor and diode to the existing vehicle wiring by way of the connector box 30. An indicator box identified as boxes I1–I7, is associated with each sensing resistor. The boxes U8–U11 are each identical to indicator box I4, for example including its resistor R4 and diode D4. Each of these indicator boxes is shown in more detail in FIGS. 4 or 5 and includes one of the indicator lights 16 shown in FIG. 1.

It is noted that the indicator boxes I1 and I2 couple directly across their respective resistors R1 and R2 whereas the remaining indicator boxes couple from the resistor to ground. The indicator boxes I1 and I2 are of the type shown in FIG. 4 whereas the other indicator boxes are of the type shown in FIG. 5. The indicator light in box I1 is for detecting whether the switch S1 has closed or not and similarly the indicator light in box 12 is for indicating whether the switch S2 has closed or not.

It is noted that the switches S1 and S2 have filter circuits F1' and F2' associated therewith. The switches S1 and S2 are magnetically operated switches which are shown in more detail as to their position in the vehicle in FIGS. 7 or 8. Basically, the switch S1 may indicate a condition wherein the trailer of the vehicle is displaced to one side relative to being in line with the cab of the vehicle. The switch S2 then indicates an angular displacement in the other direction.

Figure 4:
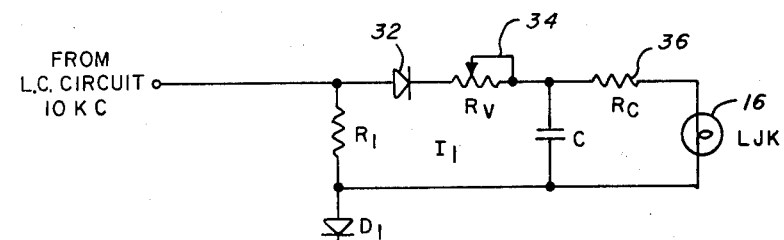
FIG. 4 shows a circuit diagram of one of the indicator circuits shown in FIG. 2 and more particularly for one of the indicator circuits I1 or I2.

FIG. 4 shows a circuit diagram of the indicator box I1 having associated therewith resistor R1, diode D1, switch S1, and filter circuit F1'. FIG. 4 also shows the marker lights ML which receive their normal operating power by way of diode D12. In FIG. 4 the indicator box I1 includes a diode 32, a variable resistor 34, a constant resistor 36, a capacitor C, and one of the indicator lights 16 of display panel 12. This indicator 16 is for indicating one of the two jacknife conditions.

There are two circuit conditions that can exist, one where switch S1 is closed and the other where switch S1 is open. When switch S1 is open wherein the cab and trailer are in line, a relatively small current flows through resistor R1 and diode D1 and also through the marker lights ML. Capacitor C is charged by way of diode 32 and variable resistor 34 during the pulse interval depicted in FIG. 3B. However, with the switch S1 open there is not sufficient current to charge capacitor C to an appreciable value. It is also noted that the current that does flow through the lights ML is at a duty cycle (see FIG. 3A) that is low enough to not cause illumination thereof if the marker lights have not been turned on by way of switch MLS. After the pulse period shown in FIG. 3B has terminated capacitor C discharges primarily by way of resistor 36 and the marker lights ML. The variable resistor 34 is preferably selected so that the charge time constant of capacitor C is significantly longer than the discharge time constant of capacitor C so that after a plurality of pulse cycles there is still not an integrated voltage across capacitor C that is sufficient to illuminate indicator 16.

Alternatively, if switch S1 closes the 10KC pulse signal is now effectively shorted to ground through switch S1 and filter F1'. The current delivered to capacitor C is much larger when switch S1 is closed. When the charging pulse has terminated the capacitor C can discharge but the discharge time constant is now much longer than the charging time constant and thus after a very few cycles the capacitor C becomes charged to a point where the indicator lamp 16 stays illuminated.

The indicator box 12 shown in FIG. 2 operates similarly and its associated indicator light will be illuminated when the switch S2 closes. It is also noted that if the marker lights ML are burnt out and thus open this does not effect the operation of the indicator lights associated with the indicator boxes I1 and I2. With these lights open the discharge time constant is effectively infinite and when the switch S1 is open the fact that the lights ML are open does not effect the operation of the indicator box I1 with reference to FIG. 4.

Figure 3B:
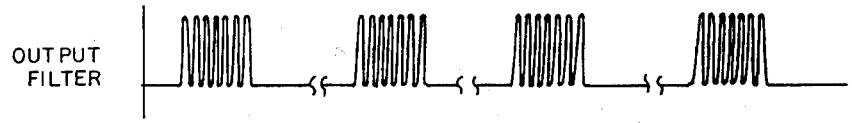
Figure 5:
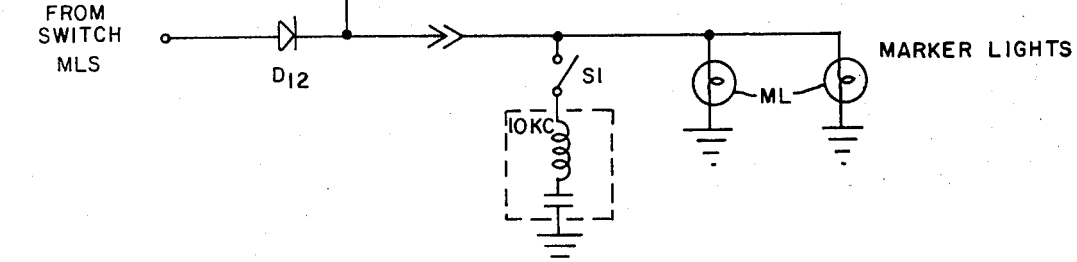
FIG. 5 is a circuit diagram of the other indicator circuit shown in FIG. 2.
Figure 5:
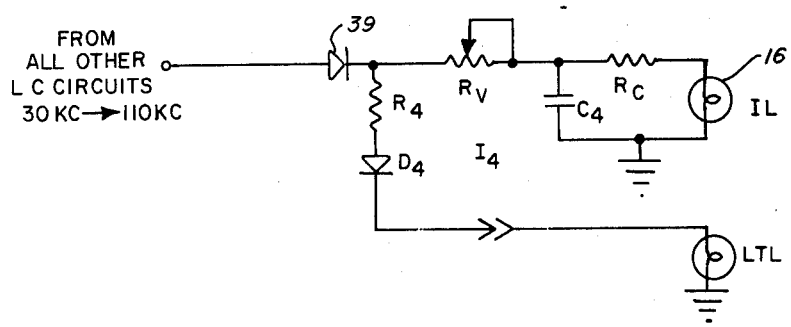

FIG. 5 shows one of the other indicator boxes and more particularly, for example, indicator box I4 which includes capacitor C4 and indicator lamp 16 which is also part of the display console in the driving compartment of the vehicle. In the circuit shown in FIG. 5 when the pulse shown in FIG. 3B is coupled to the circuit and when the operating lamp LTL (left turn lamp) is properly operating then the current delivered by way of diode 39 is primarily conducted through resistor R4 and diode D4 to lamp LTL. There is not sufficient current delivered to capacitor C4 to cause it to charge to an appreciable value and after the termination of the pulse shown in FIG. 3B the discharge time constant of capacitor C4 is shorter than its charge time constant so that capacitor C4 does not assume a full charge and thus indicator lamp 16 remains off. However, if the lamp LTL opens then the discharge time associated with capacitor C4 increases and therefore the corresponding indicator lamp 16 becomes illuminated. The discharge time in this condition for capacitor C4 is relatively long as the discharge path through lamp LTL is no longer there.

Accordingly, capacitor C4 will maintain its charge and hold lamp 16 illuminated indicating a fault in its associated LTL operating lamp.

Figure 6:
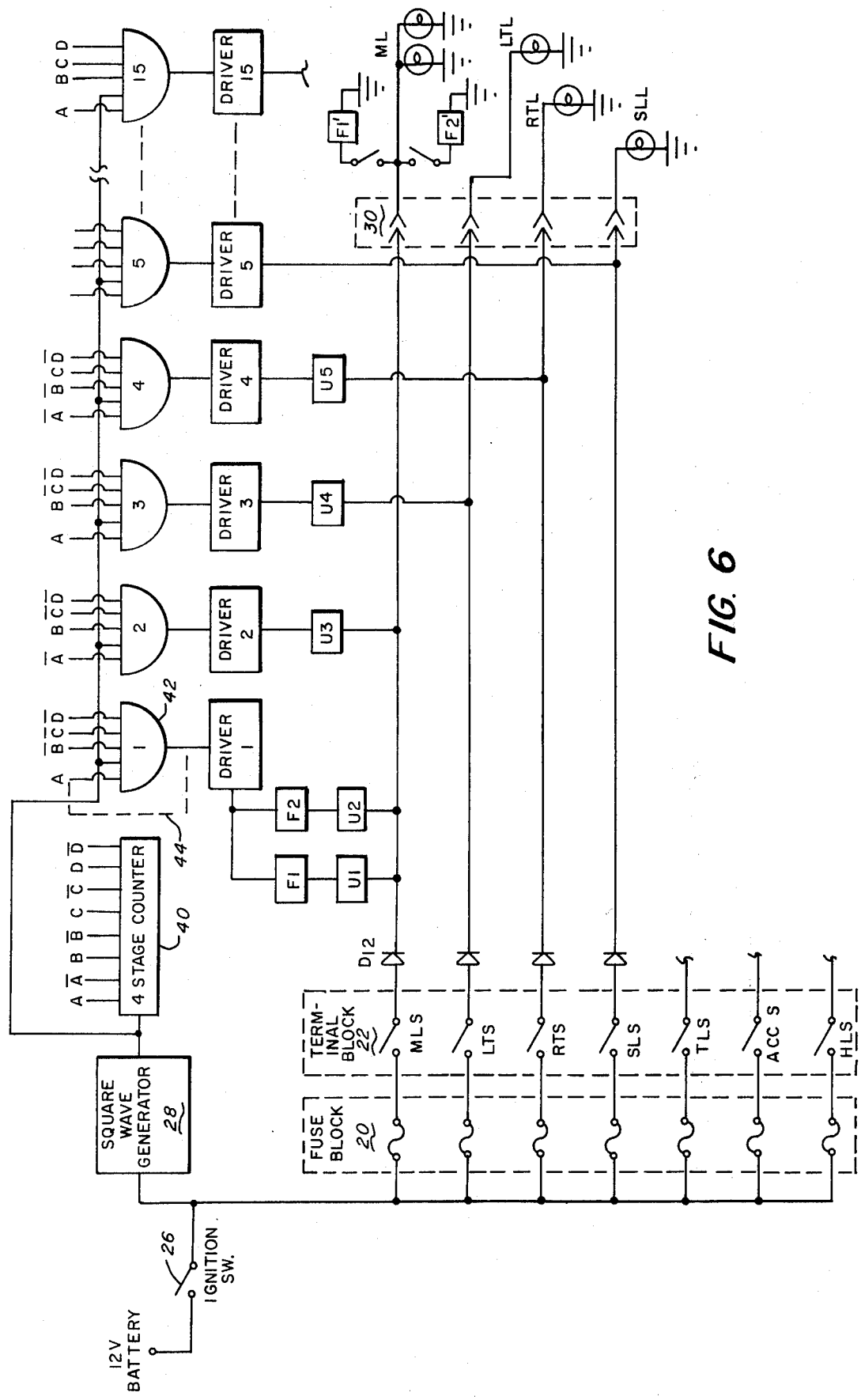
FIG. 6 shows another circuit diagram of an alternate embodiment of the present invention.

FIG. 6 shows another embodiment of this system of this invention. In FIG. 6 many of the blocks and components are identified identically with the blocks and components shown in FIG. 2. Thus, the system of FIG. 6 includes a fuse box 20; a switch array 22; a connector 30; ignition switch 26; and a squarewave generator 28. FIG. 6 also shows the lines coupling from the switch array to the connector 30 by way respectively of a diode. The monitoring or sensing system of the present invention as depicted in the embodiment of FIG. 6 includes a plurality of sensing lines that connect respectively with the existing wiring that couples from the switch array 22 to the connector 30.

As in the embodiment of FIG. 2 the power from the ignition switch 26 couples to the squarewave generator 28. In the embodiment of FIG. 6 the squarewave generator 28 may operate at a higher duty cycle and possibly a higher frequency than the squarewave generator shown in FIG. 2. In FIG. 6 the output of this generator couples to a conventional four stage counter 40 having the outputs as depicted in FIG. 6. The outputs from the four stage counter connect to decoder 44 which comprises a plurality of AND gates 42. Each of these AND gates receive a different output from the counter and have an output that couple to drivers 1–15. In the embodiment of FIG. 6 15 drivers are shown. However, the system can be easily modified to use fewer or less drivers depending upon the number of load devices that are being monitored. The counter 40 and decoder 44 are arranged so that a high level or enabling signal is provided in succession at the output from each gate 52. Accordingly, the drivers are selectively and sequentially enabled one at a time in this embodiment.

The output from driver 1, for example, couples to filter circuits F1 and F2 and from there respectively to sensor boxes U1 and U2. This arrangement of filters and sensor boxes may be identical to the arrangement shown in FIG. 4 wherein each of the filters includes a capacitor and inductor tuned to a different frequency, and each of the sensor boxes includes a resistor and diode connected in series and a sensing indicator circuit such as the one shown in FIG. 4. It is also noted in FIG. 6 that the line coupling to the marker lights ML also has connected thereto the switches S1 and S2 and their respective filter circuits as previously depicted in FIG. 2.

Accordingly, when driver DR1 is activated periodically as determined by the frequency of operation of generator 28, the switches S1 and S2 are interrogated to determine if either one has closed due to a jacknife condition between the trailer and cab. The operation of both of these switches has been discussed in detail hereinbefore with reference to the embodiment in FIG. 2.

The other sensor boxes U3–U15 may be identical to the arrangement shown in FIG. 5 and thus box U4, for example, may include a series connected diode and resistor arrangement and an indicator box as shown in FIG. 5 including a capacitor and corresponding indicator light 16. Inasmuch as embodiment of FIG. 6 may be for use in the identical system as the embodiment of FIG. 2, some of the existing connections are omitted.

In both of the embodiments in FIG. 2 and FIG. 6 there are shown the switches S1 and S2 for detecting a jackknife condition. FIGS. 7A and 7B show one embodiment for thse switches S1 and S2 regarding their placement in the vehicle. FIG. 7A shows the cab towplate 50 having the magnetic switches S1 and S2 preferably embedded therein. FIG. 7B shows a cross-sectional view through the cab towplate 50 also showing the trailer towplate 51 which mates therewith. The trailer towplate 51 preferably has a pair of permanent magnets M1 and M2 positioned similarly to switches S1 and S2 when the cab and trailer are in line. The view of FIG. 7B shows the two towplates in line.

If the cab and trailer can become out of line in one direction by some predetermined angular displacement then it can be seen that the permanent magnets may be disposed so that magnet M2 is intermediate switches S1 and S2 and magnet M1 is to the left of switch S1 as viewed in FIG. 7A. In that case, a sufficient field would still be established with regard to switch S1 and it would be maintained opened. Alternatively, switch S2 would close to indicate that jacknife condition. Alternatively, if the movement is in the opposite direction then switch S1 would be caused to close and switch S2 would be maintained opened.

FIG. 8 shows still another embodiment for the switches S1 and S2. FIG. 8 shows the junction box 56 which is typically provided at the front end of the trailer for connecting the cable 54 from the tractor to the trailer. In FIG. 8 the tractor and trailer are shown out of line and in this embodiment there is provided a sensor arm 58 which is connected firmly to the junction box 56 and a switch holding brace 60 which is mounted to the cable 54. The switches S1 and S2 are disposed at opposite ends of the brace 60. The switches are of the type that are maintained normally open unless the arm 58 swings adjacent thereto as depicted in view of FIG. 8. When that occurs the associated switch closes and as indicated in the embodiments of FIGS. 2 or 6 a corresponding indicator light is illuminated to indicate the particular jacknife condition.

It has been found that for certain fault conditions the operator of the vehicle may be able to temporarily correct the fault condition such as by adding water to a radiator and then when the vehicle is returned to the storage garage or main terminal this fault condition is not reported. Thus, the vehicle is still susceptible to being disabled at a later time possibly under more adverse circumstances. Also, if the sensor happens to be one that senses a worn brake lining, the operator of the vehicle is apt not to report this condition immediately, assuming that there is no immediate danger.

Under the above conditions and other conditions it is desired to incorporate one or more memory circuits that store an indication of the fault and maintain this stored condition even if the fault is corrected or if the fault is not reported. When the vehicle is returned to the garage or main terminal it is periodically subjected to a diagnosis by a read-out device which determines if any of the memory circuits have been set to their fault state. Also, in accordance with the present invention the memory circuits maintain their stored fault indication even when the ignition of the vehicle is turned off. Only when the power to the circuit is interrupted such as by removing one of the battery cables will the memory circuits possibly lose their fault condition storage. Thus, to sense the interruption of power another memory circuit is used which senses this interruption of power condition. The state of this memory circuit can also be read when the vehicle has returned to the garage.

Figure 9:
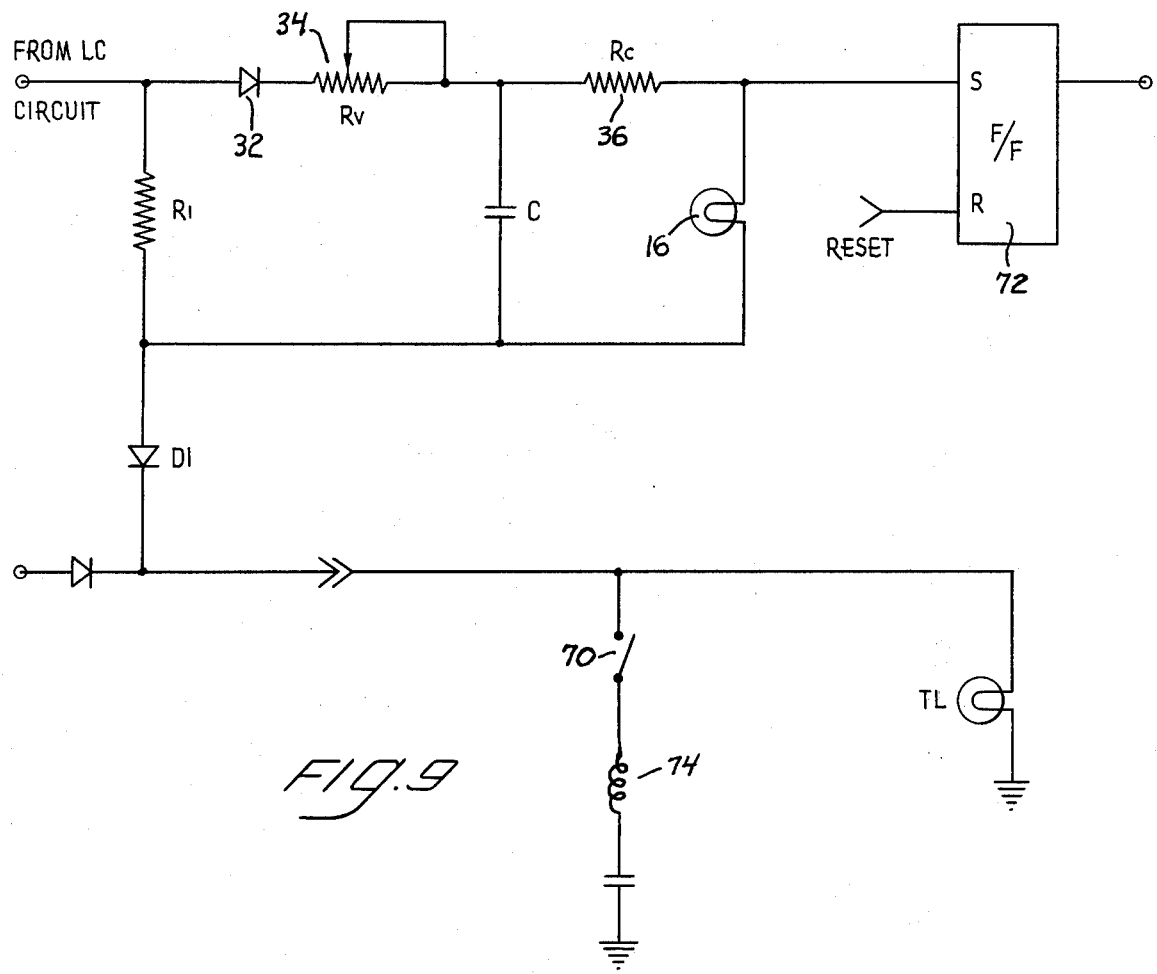
FIG. 9 is a circuit embodiment similar to the one shown in FIG. 4 and further including a memory storage circuit.

In connection with this aspect of the present invention reference is now made to FIG. 9 which shows a circuit that is substantially identical to the circuit shown in FIG. 4 and operates in the same manner so that when switch 70 is open capacitor C does not reach a sufficient charge to illuminate lamp 16. When switch 70, which is the coolant detector switch in the embodiment of FIG. 9, is closed then capacitor C can charge and cause illumination of lamp 16. When this condition does occur there is also sufficient voltage delivered to lamp 16 to cause flip-flop 72 to be set. Thus, the flip-flop 72 is a memory storage circuit that maintains this set condition even if the coolant switch 70 later closes and the indicator lamp 16 extinguishes. The flip-flop 72 is the type that will only be reset when a reset signal is coupled to the flip-flop 72. Although FIG. 9 does not show the diagnostic apparatus, this apparatus would include a means for applying a reset signal to the flip-flop 72 after the state of the flip-flop had been examined.

Theoretically, the state of the flip-flop 72 may be sensed by a volt meter to determine if it is set or reset. The resetting of the flip-flop 72 can simply be accomplished by a momentary push-button switch coupled to the appropriate voltage level for causing resetting of the flip-flop. Of course, when a number of fault conditions are being monitored there are actually a plurality of flip-flops like flip-flop 72 shown in FIG. 9 and thus there would also be a plurality of readouts that are taken at the output of these flip-flops. The readout device could comprise a lamp array wherein each of the lamps would be illuminated if the corresponding flip-flop is in its set condition indicating that the fault has occurred.

It is noted in FIG. 9 that the coolant detector switch 70 couples to an L-C circuit 74 in a similar arrangement to the one shown in FIG. 4. The L-C circuit 74 preferably passes frequencies that are the same passed by the L-C circuit which couples to resistor R1 shown in FIG. 9. The switch 70 also couples to the tail light but other existing lines could be used for sensing the condition set forth in FIG. 9.

In FIG. 9 there has been shown a coolant detector switch 70. Obviously, other sensing arrangements could be used to detect such conditions as the overheating of a bearing, excessive or insufficient tire pressure, excessive speed, or brake lining wear.

Figure 10:
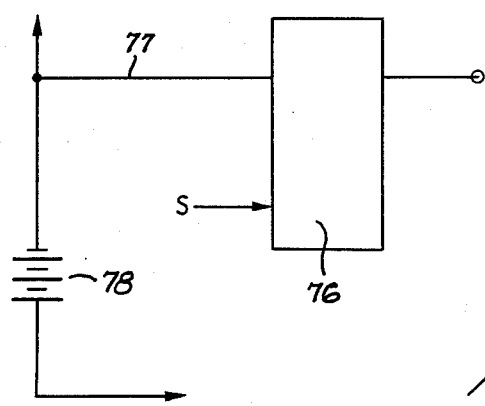
FIG. 10 is a circuit diagram showing another memory circuit for detecting power interruption.

As previously mentioned, it is possible that the driver of the vehicle will attempt to hide the fault condition. For example, if one of the sensors detects excessive speed the driver may not want this to be diagnosed. Thus, by removing the battery cable and reconnecting it the memory circuit associated with this speed detector sensor may be reset. Thus, in accordance with the present invention there is also provided a memory circuit 76 such as the one shown in FIG. 10 which has an input line 77 coupled from battery 78. Battery 78 is the normal vehicle storage battery and is shown in FIG. 10 as having outputs that couple to the vehicle electrical system for operating the vehicle. The memory circuit 76 may be a flip-flop or may be another type of bi-stable device. The set input to the device is activated by the diagnostic operator and as long as power is provided from the battery 78 by way of line 77 device 76 will remain set. If power is interrupted by disconnecting one of the leads to the battery, then the device 76 will automatically reset. FIG. 10 is a somewhat schematic diagram of an implementation of this concept and in an actual circuit implementation there may be other connection to the device 76 so that it is assured that if either cable of the battery 78 is disconnected, that the device 76 will reset. Similarly, the device 76 may be initially reset by the diagnostic person and then would be set if either of the battery cables is decoupled.

Having described a limited number of embodiments of the present invention it should now be apparent to one skilled in the art that numerous modifications can be made therein without departing from the scope of the present invention. For example, in the embodiment shown in FIG. 2 there have been shown a plurality of filter circuits. Actually, some of these filter circuits such as filter circuits F5 and F6 need not be used as the corresponding sensing circuit connects only to one existing line. Alternatively, it is noted with regard to filter circuits F1 and F2 that these are necessary in that both of them connect to the same existing wiring of the vehicle. Also, FIG. 6 depicts a system wherein the sensing is by sequential interrogation. In an alternate arrangement at least some of the drivers could be concurrently activated thereby reducing some of the logic that is necessary in this embodiment. One reason for using either the filter or decoder selective sampling technique is to conserve power. For example, without the filters, the source sees a lower impedance and thus more power is drawn. The higher power requirement in turn dictates the use of more expensive components such as the diodes. Also, regarding FIGS. 9 and 10 it is noted that the memory circuit has been shown as being coupled to an sensing and indicating circuit of the type shown in FIG. 4. Similarly, the memory circuit or flip-flop could also be coupled to an arrangement like the one shown in FIG. 5 wherein the flip-flop would then be coupled across the indicator lamp 16 shown in FIG. 5.

What is claimed is:
1. In a motor vehicle having a driving compartment, a number of electrical load devices and means including separate conductor means for providing power to each of the load devices for operation thereof, a system for monitoring the operable condition of each load device comprising;
   a display console disposed in the driving compartment and including a plurality of indicator means one being associated with each load device,
   oscillator means for establishing a cyclic signal having a relatively low duty cycle,
   means for coupling said cyclic signal to at least one of said conductor means including a unilaterally conducting device have anode and cathode electrodes and means for sensing a change in state of the load device from an operative to inoperative state,
   said conductor means also including a unilaterally conducting device having anode and cathode electrodes,
   power providing means for coupling load power to said conductor means,
   said unilaterally conducting devices of said means for coupling and said conductor means having like electrodes intercoupled,
   and means coupled from said sensing means to said indicator means and responsive to said load device assuming its inoperative state to operate the corresponding indicator means of the display console.

2. The system of claim 1 wherein said means coupling said cyclic signal includes narrow band filter means coupled from said oscillator means for receiving said cyclic signal and coupling signals of only a predetermined narrow range of frequencies through said first unilaterally conducting device.

3. The system of claim 2 including a plurality of filters each for passing a different band of frequencies and each coupling from the oscillator means to different load devices.

4. The system of claim 1 wherein said sensing means includes a current sensor and energy storage means.

5. The system of claim 1 wherein said means coupling said cyclic signal includes two filter means coupled in parallel each receiving said cyclic signal and coupling signals of two different frequencies on one of said conductor means.

6. The system of claim 5 including a second set of filter means disposed at the load end of the conductor means, each passing respective frequencies corresponding to the said two filter means.

7. The system of claim 1 including memory means coupled to said indicator means and responsive to a change in state of said load device to store an indication of this change, said memory means state being maintained even though the load device is made operative.

8. A system for use in a motor vehicle having existing conductor means coupling to load devices of the vehicle, said system to determine if a fault has occurred comprising;
   a plurality of sensors each for monitoring a predetermined condition, each said sensor generally having an actuated state when a fault occurs and an unactuated state in the absence of a fault,
   means responsive to the state of each sensor for causing a fault indication detectable by the driver of the vehicle when the sensor assumes it actuated state,
   each said sensor and means for causing a fault indication coupling to one of said existing conductor means,
   a plurality of memory storage means responsive to the state of each sensor for setting said memory means to a fault indicating state when said sensor assumes its actuated state,
   said memory means maintaining said fault indicating state even though said sensor may assume its unactuated state,
   and means for resetting the state of each memory means.

9. The system of claim 8 wherein said memory means includes a bistable electrical device.

10. The system of claim 8 comprising oscillator means defining a cyclic signal and means coupling said cyclic signal to at least one conductor means.

11. The system of claim 10 wherein said means coupling said cyclic signal includes narrow band filter means coupled from said oscillator means for receiving said cyclic signal and coupling signals only of a predetermined narrow range of frequencies.

12. The system of claim 11 including a plurality of filters each for passing a different band of frequencies and each coupling from the oscillator to different load devices.

13. The system of claim 8 further comprising a power providing source coupled to at least the memory storage means and sensors of the system and a memory device coupled to the power providing source to sense the disconnection of the source from the system.

14. The system of claim 13 wherein the memory means and memory device include a bistable flip-flop having a reset input and said means for causing a fault indication comprises an indicator circuit including a charging circuit and an indicator lamp.

15. The system of claim 3 wherein said sensing means includes a current sensor resistor and said means coupled from said sensing means to said indicator means comprises a circuit including a capacitor, a diode and a variable resistor, said capacitor, diode and variable resistor being coupled across said sensor resistor and said indicator means comprising a lamp coupled across said capacitor.

16. The system of claim 15 including a bistable flip-flop coupled to the capacitor and set when the capacitor is sufficiently charged.

17. The system of claim 3 wherein said sensing means includes a current sensor resistor and said means coupled from said sensing means to said indicator means comprises a circuit including a capacitor, said indicator means including a lamp and means for coupling the lamp across the capacitor whereby when the load device is operative the capacitor is discharged to a sufficient low level to maintain the indicator lamp off and when the load device is inoperative the capacitor is charged to a sufficient level to turn the indicator lamp on thereby indicating a fault of the load device.

18. A system for use in a motor vehicle to determine the fault of a load device comprising;
 a source of power,
 means defining a first path coupled from the source for carrying the normal operating power to the load device,
 oscillator means for establishing a cyclic signal,
 means defining a second path coupled from the oscillator means for coupling the cyclic signal directly to the load device,
 indicator means,
 said means defining a second path including filter means for passing signals of a predetermined band of frequencies and means for sensing a change in current flow in the second path upon the occurrence of a fault in the load device to operate the indicator means.

19. A system as set forth in claim 18 wherein said means defining a first path includes a first unilaterally conducting device and said means defining a second path including a second unilaterally conducting device.

20. A system as set forth in claim 18 wherein said oscillator means establishes a square wave signal of low duty cycle.

21. A system as set forth in claim 18 including an operating switch for the load device disposed in the first path.

22. A detection system for a vehicle having a load device comprising;
 a sensor for monitoring a predetermined condition, said sensor having an actuated state when a fault occurs in the load device and an unactuated state in the absence of a fault,
 means responsive to the state of the sensor for causing a fault indication detectable by the driver of the vehicle when the sensor assumes its actuated state,
 memory storage means responsive to the state of said sensor for setting said storage means to a fault indicating state when said sensor assumes its actuated state,
 a source of power disposed in the vehicle and including means for providing power to the memory storage means and sensor,
 and a memory device coupled to the source of power to sense the disconnection of the source of power from the memory storage means.

23. In a motor vehicle having a driving compartment, a number of electrical load devices and means including separate conductor means for providing power to each of the load devices for operation thereof, a system for monitoring the operable condition of each load device comprising;
 a display console disposed in the driving compartment and including a plurality of indicator means one being associated with each load device,
 means for establishing a cyclic signal,
 means coupling said cyclic signal to at least one of said conductor means and including means for sensing a change in state of the load device from an operative to inoperative state,
 said means coupling said cyclic signal including a plurality of narrow band filters each for passing a different band of frequencies and each coupling from the means for establishing a cyclic signal,
 and means coupled from said sensing means to said indicator means and responsive to said load device assuming its inoperative state to operate the corresponding indicator means of the display console.

* * * * *